US012414586B2

(12) United States Patent
Hejazi et al.

(10) Patent No.: US 12,414,586 B2
(45) Date of Patent: Sep. 16, 2025

(54) SURFACE ACOUSTIC WAVE ATOMIZER FOR AEROSOL DELIVERY DEVICE

(71) Applicant: RAI STRATEGIC HOLDINGS, INC., Winston-Salem, NC (US)

(72) Inventors: Vahid Hejazi, Concord, NC (US); Andries D. Sebastian, Winston-Salem, NC (US); Cassidy S. McMahan, Pfafftown, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 800 days.

(21) Appl. No.: 16/657,290

(22) Filed: Oct. 18, 2019

(65) Prior Publication Data

US 2021/0112882 A1 Apr. 22, 2021

(51) Int. Cl.
*A24F 40/46* (2020.01)
*A24F 40/40* (2020.01)
*B05B 17/06* (2006.01)

(52) U.S. Cl.
CPC .............. *A24F 40/46* (2020.01); *A24F 40/40* (2020.01); *B05B 17/0607* (2013.01)

(58) Field of Classification Search
CPC .......... A24F 40/10; A24F 40/05; A24F 40/40; A24F 40/42; A24F 40/46; A24F 40/51; A24F 40/00
See application file for complete search history.

(56) References Cited

U.S. PATENT DOCUMENTS 5,996,903 A 12/1999 Asai et al.
8,998,483 B2 4/2015 Friend et al.
(Continued)

FOREIGN PATENT DOCUMENTS

CN 206423575 8/2017
EP 3228345 10/2017
(Continued)

OTHER PUBLICATIONS

"Which Metals Can Be Heated Using Induction?" Eldec LLC, Jul. 9, 2020, https://www.inductionheatingexperts.com/resources/metals-can-be-induction-heated/. (Year: 2020).*
International Search Report in the corresponding International Application No. PCT/IB2020/059733, dated Jan. 25, 2021, 6 pages.
J. Mcintyre. Synthetic Fibres: Nylon, Polyester, Acrylic, Polyolefin. In: "Synthetic Fibres, Nylon, Polyester, Acrylic, Polyolefin", Elsevier Science & Technology, 2004, Sections 3.9.1-3.9.5, pp. 139-145. Retrieved from the Internet: <URL: http://ebookcentral.proquest.com/lib/epo-ebooks/detail.action?docID=1640020>.
(Continued)

*Primary Examiner* — Michael H. Wilson
*Assistant Examiner* — Stephanie Lynn Moore
(74) *Attorney, Agent, or Firm* — Womble Bond Dickinson (US) LLP

(57) ABSTRACT

The present disclosure provides an aerosol delivery device and a liquid delivery and atomization assembly for use with an aerosol delivery device. In one implementation, the liquid delivery and atomization assembly may comprise a liquid composition, an atomization assembly, and a liquid transport element configured to transport at least a portion of the liquid composition to the atomization assembly. The atomization assembly may comprise a piezoelectric component that includes an interdigital transducer configured to generate surface acoustic waves that vaporize the portion of the liquid composition to generate an aerosol. The liquid transport element may comprise one or more of a fibrous material that includes fibers having a multi-lobal cross-section, a perforated disk, or a combination thereof. The perforated disk may include a plurality of openings and a plurality of microchannels that extend from a periphery of the disk to the plurality of openings.

14 Claims, 9 Drawing Sheets

(56) References Cited

U.S. PATENT DOCUMENTS

| | | | |
|---|---|---|---|
| 9,770,055 B2 | 9/2017 | Cameron et al. | |
| 9,848,648 B2 | 12/2017 | Memari et al. | |
| 9,854,847 B2 | 1/2018 | Sears et al. | |
| 9,867,398 B2 | 1/2018 | Guo et al. | |
| 9,936,737 B2 | 4/2018 | Cameron et al. | |
| 10,004,259 B2 | 6/2018 | Sebastian et al. | |
| 2006/0196518 A1 | 9/2006 | Hon | |
| 2008/0084134 A1 | 4/2008 | Morita et al. | |
| 2009/0151717 A1 | 6/2009 | Bowen et al. | |
| 2013/0213419 A1 | 8/2013 | Tucker et al. | |
| 2013/0319404 A1 | 12/2013 | Feriani et al. | |
| 2014/0238423 A1 | 8/2014 | Tucker et al. | |
| 2014/0238424 A1* | 8/2014 | Macko | A24F 40/46 131/328 |
| 2014/0261487 A1 | 9/2014 | Chapman et al. | |
| 2015/0034103 A1 | 2/2015 | Hon | |
| 2015/0101606 A1 | 4/2015 | White | |
| 2015/0117841 A1 | 4/2015 | Brammer et al. | |
| 2015/0238423 A1 | 8/2015 | Wertz et al. | |
| 2015/0245669 A1* | 9/2015 | Cadieux | A24F 40/42 131/329 |
| 2016/0213866 A1 | 7/2016 | Tan | |
| 2016/0271347 A1 | 9/2016 | Raichman | |
| 2016/0366946 A1 | 12/2016 | Murison et al. | |
| 2017/0042241 A1 | 2/2017 | Murison et al. | |
| 2017/0064997 A1 | 3/2017 | Murison et al. | |
| 2017/0157341 A1 | 6/2017 | Pandya et al. | |
| 2017/0238608 A1 | 8/2017 | Matsumoto et al. | |
| 2017/0280771 A1* | 10/2017 | Courbat | B05B 17/0607 |
| 2017/0303594 A1 | 10/2017 | Cameron et al. | |
| 2017/0368273 A1 | 12/2017 | Rubin | |
| 2018/0038838 A1 | 2/2018 | Karancsi et al. | |
| 2018/0090923 A1 | 3/2018 | Li et al. | |
| 2018/0153217 A1 | 6/2018 | Liu et al. | |
| 2018/0161525 A1 | 6/2018 | Liu et al. | |
| 2018/0169691 A1 | 6/2018 | Macloughlin et al. | |
| 2018/0289076 A1 | 10/2018 | Manca et al. | |
| 2019/0014819 A1 | 1/2019 | Sur | |
| 2019/0142066 A1* | 5/2019 | Gill | A24F 40/51 131/329 |
| 2019/0150519 A1 | 5/2019 | Liu et al. | |

FOREIGN PATENT DOCUMENTS

| | | |
|---|---|---|
| EP | 3272237 | 1/2018 |
| EP | 3278678 | 2/2018 |
| EP | 3287019 | 2/2018 |
| EP | 3298912 | 3/2018 |
| EP | 3305104 | 4/2018 |
| JP | H11-221505 A | 8/1999 |
| WO | WO2016165055 | 10/2016 |
| WO | WO2017051181 | 3/2017 |
| WO | WO2017063256 | 4/2017 |
| WO | WO2017149165 | 9/2017 |
| WO | WO2017175218 | 10/2017 |
| WO | WO2017201710 | 11/2017 |
| WO | WO2017201716 | 11/2017 |
| WO | WO2017202014 | 11/2017 |
| WO | WO2017206022 | 12/2017 |
| WO | WO2017206480 | 12/2017 |
| WO | WO2017215221 | 12/2017 |
| WO | WO2018000756 | 1/2018 |
| WO | WO2018000760 | 1/2018 |
| WO | WO2018000761 | 1/2018 |
| WO | WO2018000829 | 1/2018 |
| WO | WO2018001105 | 1/2018 |
| WO | WO2018001106 | 1/2018 |
| WO | WO2018023890 | 2/2018 |
| WO | WO2018040380 | 3/2018 |
| WO | WO2018053955 | 3/2018 |
| WO | WO2018058883 | 4/2018 |
| WO | WO2018058884 | 4/2018 |
| WO | WO2018095312 | 5/2018 |

OTHER PUBLICATIONS

Ding et al., "Surface acoustic wave microfluidics", The Royal Society of Chemistry, Jul. 2013, pp. 3626-3649.

Yeo et al., "Ultrafast microfluidics using surface acoustic waves", American Institute of Physics, 2009, pp. 1-23.

Qi et al., "Miniature inhalation therapy platform using surface acoustic wave microfluidic atomization", The Royal Society of Chemistry, May 2009, pp. 2184-2193.

Ariyakul et al., "Olfactory Display Using a Miniaturized Pump and a SAW Atomizer for Presenting Low-volatile Scents", IEEE Virtual Reality, 2011, pp. 193-194.

Olszewski et al., "A silicon-based MEMS vibrating mesh nebulizer for inhaled drug delivery", Procedia Engineering, 2016, pp. 1521-1524.

Hawkins et al., "Vibrating Mesh Nebulizer Reference Design", Microchip Technology Inc., 2016-2017, pp. 1-50.

Schwartz et al., "Transister-based microwave heaters", Tel Aviv University, Aug. 2006, pp. 1-20.

"Type 4DG Deep-Grooved Fiber; What is it?", Fiber Innovation Technology, 2019, pp. 1-9.

* cited by examiner

SURFACE ACOUSTIC WAVE ATOMIZER FOR AEROSOL DELIVERY DEVICE

TECHNOLOGICAL FIELD

The present disclosure relates to aerosol delivery devices, and more particularly to an aerosol delivery device that includes a reservoir and an atomization assembly that may utilize electrical power to vaporize a liquid composition, which may include an aerosol precursor composition, for the production of an aerosol. In various implementations, the liquid composition, which may incorporate materials and/or components that may be made or derived from tobacco or otherwise incorporate tobacco or other plants, may include natural or synthetic components including flavorants, and/or may include one or more medicinal components, is vaporized by the atomization assembly to produce an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices, and heat generating sources set forth in the background art described in U.S. Pat. No. 7,726,320 to Robinson et al., U.S. Pat. App. Pub. No. 2013/0255702 to Griffith Jr. et al., and U.S. Pat. App. Pub. No. 2014/0096781 to Sears et al., which are incorporated herein by reference in their entireties. See also, for example, the various types of smoking articles, aerosol delivery devices, and electrically powered sources referenced by brand name and commercial source in U.S. Pat. App. Pub. No. 2015/0216232 to Bless et al., which is incorporated herein by reference in its entirety.

It would be desirable, however, to provide an aerosol delivery device with enhanced functionality. In this regard, it is desirable to provide an aerosol delivery with advantageous features.

BRIEF SUMMARY

The present disclosure relates to aerosol delivery devices, methods of forming such devices, and elements of such devices. The disclosure particularly relates to an aerosol delivery device and a liquid delivery and atomization assembly for use with an aerosol delivery device. The present disclosure includes, without limitation, the following example implementations:

An aerosol delivery device comprising a housing including a power source and a control component, a reservoir configured to contain a liquid composition, an atomization assembly, and a liquid transport element configured to transport at least a portion of the liquid composition to the atomization assembly, wherein the atomization assembly is configured to be controlled by the control component and comprises a piezoelectric component that includes an interdigital transducer configured to generate surface acoustic waves that vaporize the portion of the liquid composition to generate an aerosol, wherein the liquid transport element comprises one or more of a fibrous material that includes fibers having a multi-lobal cross-section, a perforated disk, or a combination thereof, wherein the perforated disk includes a plurality of openings and a plurality of microchannels, and wherein the plurality of openings extend through at least a portion of the disk and each of the plurality of microchannels extends from a periphery of the disk to a respective one of the plurality of openings.

The aerosol delivery device of any preceding example implementation, or any combination of any preceding example implementations, wherein the liquid transport element comprises a deep groove fibrous material.

The aerosol delivery device of any preceding example implementation, or any combination of any preceding example implementations, wherein the piezoelectric component comprises a piezoceramic.

The aerosol delivery device of any preceding example implementation, or any combination of any preceding example implementations, wherein the piezoceramic is in the form of a disk or a ring.

The aerosol delivery device of any preceding example implementation, or any combination of any preceding example implementations, wherein the piezoelectric component comprises a piezoelectric material deposited on a surface of a substrate.

The aerosol delivery device of any preceding example implementation, or any combination of any preceding example implementations, wherein at least a portion of the atomization assembly is further configured to be heated via an induction heating arrangement.

The aerosol delivery device of any preceding example implementation, or any combination of any preceding example implementations, wherein at least a portion of the piezoelectric component comprises a resonant receiver of the induction heating arrangement.

The aerosol delivery device of any preceding example implementation, or any combination of any preceding example implementations, wherein a helical coil comprises a resonant transmitter of the induction heating arrangement.

The aerosol delivery device of any preceding example implementation, or any combination of any preceding example implementations, wherein at least a portion of the piezoelectric component is coated with a material configured to facilitate induction heating.

The aerosol delivery device of any preceding example implementation, or any combination of any preceding example implementations, wherein the piezoelectric component is loaded with a material configured to facilitate induction heating.

A liquid delivery and atomization assembly for use with an aerosol delivery device, the assembly comprising a liquid composition, an atomization assembly, and a liquid transport element configured to transport at least a portion of the liquid composition to the atomization assembly, wherein the atomization assembly comprises a piezoelectric component that includes an interdigital transducer configured to generate surface acoustic waves that vaporize the portion of the liquid composition to generate an aerosol, wherein the liquid transport element comprises one or more of a fibrous material that includes fibers having a multi-lobal cross-section, a perforated disk, or a combination thereof, wherein the perforated disk includes a plurality of openings and a plurality of microchannels, and wherein the plurality of openings extend through at least a portion of the disk and each of the plurality of microchannels extends from a periphery of the disk to a respective one of the plurality of openings.

The liquid delivery and atomization assembly of any preceding example implementation, or any combination of any preceding example implementations, wherein the liquid transport element comprises a deep groove fibrous material.

The liquid delivery and atomization assembly of any preceding example implementation, or any combination of any preceding example implementations, wherein the piezoelectric component comprises a piezoceramic.

The liquid delivery and atomization assembly of any preceding example implementation, or any combination of any preceding example implementations, wherein the piezoceramic is in the form of a disk or a ring.

The liquid delivery and atomization assembly of any preceding example implementation, or any combination of any preceding example implementations, wherein the piezoelectric component comprises a piezoelectric material deposited on a surface of a substrate.

The liquid delivery and atomization assembly of any preceding example implementation, or any combination of any preceding example implementations, wherein at least a portion of the atomization assembly is further configured to be heated via an induction heating arrangement.

The liquid delivery and atomization assembly of any preceding example implementation, or any combination of any preceding example implementations, wherein at least a portion of the piezoelectric component comprises a resonant receiver of the induction heating arrangement.

The liquid delivery and atomization assembly of any preceding example implementation, or any combination of any preceding example implementations, wherein a helical coil comprises a resonant transmitter of the induction heating arrangement.

The liquid delivery and atomization assembly of any preceding example implementation, or any combination of any preceding example implementations, wherein at least a portion of the piezoelectric component is coated with a material configured to facilitate induction heating.

The liquid delivery and atomization assembly of any preceding example implementation, or any combination of any preceding example implementations, wherein the piezoelectric component is loaded with a material configured to facilitate induction heating.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

BRIEF DESCRIPTION OF THE DRAWINGS

In order to assist the understanding of aspects of the disclosure, reference will now be made to the appended drawings, which are not necessarily drawn to scale and in which like reference numerals refer to like elements. The drawings are provided by way of example to assist understanding of aspects of the disclosure, and should not be construed as limiting the disclosure.

DETAILED DESCRIPTION

Figure 1:
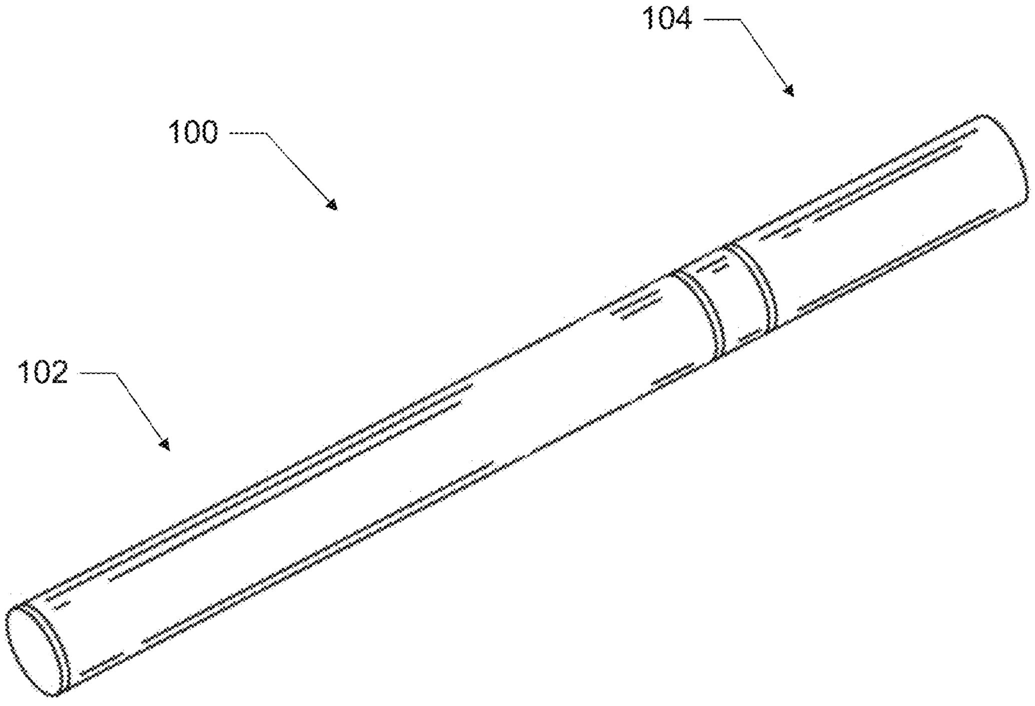
FIG. 1 is a perspective view of an aerosol delivery device, according to an example implementation of the present disclosure.

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms “a”, “an”, “the”, include plural referents unless the context clearly dictates otherwise.

As described hereinafter, embodiments of the present disclosure relate to aerosol delivery devices or vaporization devices, said terms being used herein interchangeably. Aerosol delivery devices according to the present disclosure use electrical energy to vaporize a material (preferably without combusting the material to any significant degree and/or without significant chemical alteration of the material) to form an inhalable substance; and components of such devices have the form of articles that most preferably are sufficiently compact to be considered hand-held devices. That is, use of components of some aerosol delivery devices does not result in the production of smoke—i.e., from by-products of combustion or pyrolysis of tobacco, but rather, use of those preferred systems results in the production of vapors resulting from vaporization of an aerosol precursor composition. In some examples, components of aerosol delivery devices may be characterized as electronic cigarettes, and those electronic cigarettes most preferably incorporate tobacco and/or components derived from tobacco, and hence deliver tobacco derived components in aerosol form.

Aerosol generating devices of certain preferred aerosol delivery devices may provide many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe that is employed by lighting and burning tobacco (and hence inhaling tobacco smoke), without any substantial degree of combustion of any component thereof. For example, the user of an aerosol generating device of the present disclosure can hold and use the device much like a smoker employs a traditional type of smoking article, draw on one end of that device for inhalation of aerosol produced by that device, take or draw puffs at selected intervals of time, and the like.

Aerosol delivery devices of the present disclosure also may be characterized as being vapor-producing articles or medicament delivery articles. Thus, such articles or devices may be adapted so as to provide one or more substances (e.g., flavors and/or pharmaceutical active ingredients) in an inhalable form or state. For example, inhalable substances may be substantially in the form of a vapor (i.e., a substance that is in the gas phase at a temperature lower than its critical point). Alternatively, inhalable substances may be in the form of an aerosol (i.e., a suspension of fine solid particles or liquid droplets in a gas). For purposes of simplicity, the term "aerosol" as used herein is meant to include vapors, gases, and aerosols of a form or type suitable for human inhalation, whether or not visible, and whether or not of a form that might be considered to be smoke-like.

Aerosol delivery devices of the present disclosure most preferably comprise some combination of a power source (i.e., an electrical power source), at least one control component (e.g., means for actuating, controlling, regulating and ceasing power, such as by controlling electrical current flow the power source to other components of the article—e.g., a microcontroller or microprocessor), an atomization assembly, a liquid composition (e.g., commonly an aerosol precursor composition liquid capable of yielding an aerosol, such as ingredients commonly referred to as "smoke juice," "e-liquid" and "e-juice"), and a mouthpiece or mouth region for allowing draw upon the aerosol delivery device for aerosol inhalation (e.g., a defined airflow path through the article such that aerosol generated may be withdrawn therefrom upon draw).

Alignment of the components within the aerosol delivery device may be variable. In specific embodiments, the aerosol precursor composition may be located between two opposing ends of the device (e.g., within a reservoir of a cartridge, which in certain circumstances is replaceable and disposable or refillable). Other configurations, however, are not excluded. Generally, the components are configured relative to one another so that energy from the atomization assembly vaporizes the aerosol precursor composition (as well as one or more flavorants, medicaments, or the like that may likewise be provided for delivery to a user) and forms an aerosol for delivery to the user. When the atomization assembly vaporizes the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof.

More specific formats, configurations and arrangements of components within the aerosol delivery devices of the present disclosure will be evident in light of the further disclosure provided hereinafter. Additionally, the selection and arrangement of various aerosol delivery device components may be appreciated upon consideration of the commercially available electronic aerosol delivery devices, such as those representative products referenced in the background art section of the present disclosure.

FIG. 1 illustrates an aerosol delivery device, according to an example implementation of the present disclosure. In particular, FIG. 1 illustrates a perspective schematic view of an aerosol delivery device 100 comprising a cartridge 104 and a control unit 102. As depicted in the figure, the cartridge 104 may be permanently or detachably aligned in a functioning relationship with the control unit 102. In some implementations, for example, the cartridge and the control unit may comprise a single, unitary part, whereas in other implementations (such as the depicted implementation), a connection therebetween may be releasable such that, for example, the control unit may be reused with one or more additional cartridges that may be disposable and/or refillable. In various implementations, a variety of different means of engagement may be used to couple a cartridge and a control unit together. For example, in some implementations the cartridge and the control unit may be coupled via one or more of a snap fit engagement, a press fit engagement, a threaded engagement, and a magnetic engagement. It should be noted that the components depicted in this and the other figures are representative of the components that may be present in a control unit and/or cartridge and are not intended to limit the scope of the control unit and/or cartridge components that are encompassed by the present disclosure.

Figure 2:
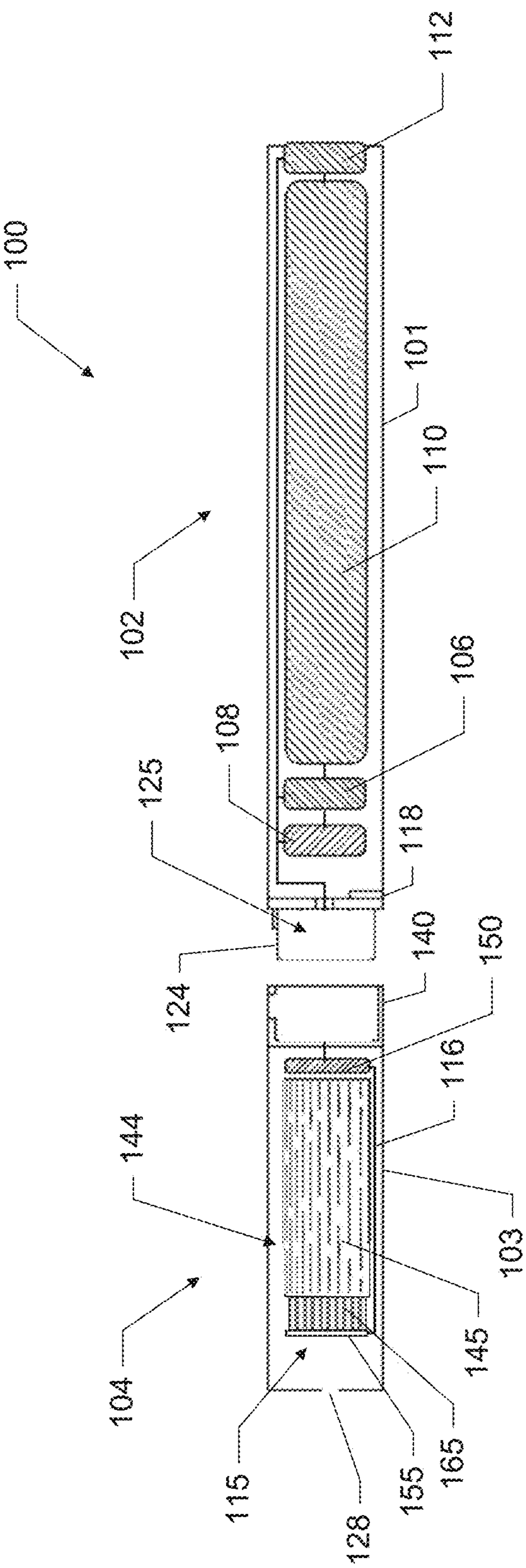
FIG. 2 illustrates a side schematic view of an aerosol delivery device, according to an example implementation of the present disclosure.

FIG. 2 illustrates a side schematic view of the aerosol delivery device 100. As depicted, the cartridge 104 and control unit 102 of FIG. 1 are shown in a de-coupled configuration. In various implementations, the aerosol delivery device 100 may have a variety of different shapes. For example, in some implementations (such as the depicted implementation) the aerosol delivery device 100 may be substantially rod-like or substantially tubular shaped or substantially cylindrically shaped. In other implementations, however, other shapes and dimensions are possible (e.g., rectangular, oval, hexagonal, prismatic, regular or irregular polygon shapes, disc-shaped, cube-shaped, multifaceted shapes, or the like). In still other implementations, the cartridge and the control unit may each have different shapes. It should be noted for purposes of the present disclosure that the term "substantially" should be understood to mean approximately and/or within a certain degree of manufacturing tolerance as would be understood by one skilled in the art.

In the depicted implementation, the control unit 102 and the cartridge 104 include components adapted to facilitate mechanical engagement therebetween. Although a variety of other configurations are possible, the control unit 102 of the depicted implementation includes a coupler 124 that defines a cavity 125 therein. Likewise, the cartridge 104 includes a base 140 adapted to engage the coupler 124 of the control unit 102. A coupler and a base that may be useful according to the present disclosure are described in U.S. Pat. App. Pub. No. 2014/0261495 to Novak et al., the disclosure of which is incorporated herein by reference in its entirety.

It should be noted, however, that in other implementations various other structures, shapes, and/or components may be employed to couple the control unit and the cartridge. For example, in some implementations the control unit and cartridge may be coupled together via an interference or press fit connection such as, for example, implementations wherein the control body includes a chamber configured to receive at least a portion of the cartridge or implementations wherein the cartridge includes a chamber configured to receive at least a portion of the control unit. In other implementations, the cartridge and the control unit may be coupled together via a screw thread connection. In still other implementations, the cartridge and the control unit may be coupled together via a bayonet connection. In still other implementations, the cartridge and the control unit may be coupled via a magnetic connection. In various implementations, once coupled an electrical connection may be created between the cartridge and the control unit so as to electrically connect the cartridge (and components thereof) to the battery and/or via the control component of the control unit. Such an electrical connection may exist via one or more components of the coupling features. In such a manner, corresponding electrical contacts in the cartridge and the control unit may be substantially aligned after coupling to provide the electrical connection.

In specific implementations, one or both of the control unit 102 and the cartridge 104 may be referred to as being disposable or as being reusable. For example, in some implementations the control unit may have a replaceable battery or a rechargeable battery and thus may be combined with any type of recharging technology, including connection to a wall charger, connection to a car charger (e.g., cigarette lighter receptacle, USB port, etc.), connection to a computer, any of which may include a universal serial bus (USB) cable or connector (e.g., USB 2.0, 3.0, 3.1, USB Type-C), connection to a USB connector (e.g., USB 2.0, 3.0, 3.1, USB Type-C as may be implemented in a wall outlet, electronic device, vehicle, etc.), connection to a photovoltaic cell (sometimes referred to as a solar cell) or solar panel of solar cells, or wireless charger, such as a charger that uses inductive wireless charging (including for example, wireless charging according to the Qi wireless charging standard from the Wireless Power Consortium (WPC)), or a wireless radio frequency (RF) based charger, and connection to an array of external cell(s) such as a power bank to charge a device via a USB connector or a wireless charger. An example of an inductive wireless charging system is described in U.S. Pat. App. Pub. No. 2017/0112196 to Sur et al., which is incorporated herein by reference in its entirety. In further implementations, a power source may also comprise a capacitor. Capacitors are capable of discharging more quickly than batteries and can be charged between puffs, allowing the battery to discharge into the capacitor at a lower rate than if it were used to power the heating member directly. For example, a supercapacitor—e.g., an electric double-layer capacitor (EDLC)—may be used separate from or in combination with a battery. When used alone, the supercapacitor may be recharged before each use of the article. Thus, the device may also include a charger component that can be attached to the smoking article between uses to replenish the supercapacitor. Examples of power supplies that include supercapacitors are described in U.S. Pat. App. Pub. No. 2017/0112191 to Sur et al., which is incorporated herein by reference in its entirety.

As illustrated in the figure, the control unit 102 may be formed of a control unit housing 101 that includes a control component 106 (e.g., a printed circuit board (PCB), an integrated circuit, a memory component, a microcontroller, or the like), a flow sensor 108, a power source 110 (e.g., one or more batteries), and a light-emitting diode (LED) 112, which components may be variably aligned. Some example types of electronic components, structures, and configurations thereof, features thereof, and general methods of operation thereof, are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al. and U.S. Pat. No. 8,205,622 to Pan; U.S. Pat. App. Pub. Nos. 2009/0230117 to Fernando et al., 2014/0060554 to Collet et al., and 2014/0270727 to Ampolini et al.; and U.S. Pat. App. Pub. No. 2015/0257445 to Henry et al.; which are incorporated herein by reference in their entireties. Some examples of batteries that may be applicable to the present disclosure are described in U.S. Pat. App. Pub. No. 2010/0028766 to Peckerar et al., the disclosure of which is incorporated herein by reference in its entirety. In some implementations, further indicators (e.g., a haptic feedback component, an audio feedback component, or the like) may be included in addition to or as an alternative to the LED. Additional representative types of components that yield visual cues or indicators, such as light emitting diode (LED) components, and the configurations and uses thereof, are described in U.S. Pat. No. 5,154,192 to Sprinkel et al.; U.S. Pat. No. 8,499,766 to Newton and U.S. Pat. No. 8,539,959 to Scatterday; U.S. Pat. App. Pub. No. 2015/0020825 to Galloway et al.; and U.S. Pat. App. Pub. No. 2015/0216233 to Sears et al.; which are incorporated herein by reference in their entireties. It should be understood that in various implementations not all of the illustrated elements may be required. For example, in some implementations an LED may be absent or may be replaced with a different indicator, such as a vibrating indicator. Likewise, a flow sensor may be replaced with a manual actuator, such as, for example, one or more manually actuated push buttons.

In the depicted implementation, the cartridge 104 may be formed of a cartridge housing 103, which may define a reservoir 144, which in the depicted implementation is configured to contain a liquid composition 145. In some implementations, the reservoir may be part of the cartridge housing (such as, for example, comprising a molded feature of the cartridge housing), while in other implementations, the reservoir may comprise a separate part. In some implementations, the reservoir may be disposable. In other implementations, the reservoir may be refillable. In various implementations, the reservoir may be configured to contain a liquid composition, a semisolid composition, and/or a gel composition, which may comprise an aerosol precursor composition. Some examples of types of substrates, reservoirs, or other components for supporting a liquid composition are described in U.S. Pat. No. 8,528,569 to Newton; U.S. Pat. App. Pub. Nos. 2014/0261487 to Chapman et al. and 2014/0059780 to Davis et al.; and U.S. Pat. App. Pub. No. 2015/0216232 to Bless et al.; which are incorporated herein by reference in their entireties. Additionally, various wicking materials, and the configuration and operation of those wicking materials within certain types of electronic cigarettes, are set forth in U.S. Pat. No. 8,910,640 to Sears et al.; which is incorporated herein by reference in its entirety.

In some implementations, the reservoir may be made of a polymeric material that, in further implementations, may be at least partially transparent or translucent. In some implementations, such materials, may include, but need not be limited to, polycarbonate, acrylic, polyethylene terephthalate (PET), amorphous copolyester (PETG), polyvinyl chloride (PVC), liquid silicone rubber (LSR), cyclic olefin copolymers, polyethylene (PE), ionomer resin, polypropylene (PP), fluorinated ethylene propylene (FEP), styrene methyl methacrylate (SMMA), styrene acrylonitrile resin (SAN), polystyrene, acrylonitrile butadiene styrene (ABS), and combinations thereof. Other materials may include, for example, biodegradable polymers such as, but not limited to, polylactcic acid (PLA), polyhydroxyalkanoates (PHA's), and polybutylene succinate (PBS). In some implementations, the reservoir may be made of other material that may be at least partially transparent or translucent. Such materials may include, for example, glass or ceramic materials.

In some implementations, the aerosol precursor composition may incorporate tobacco or components derived from tobacco. In one regard, the tobacco may be provided as parts or pieces of tobacco, such as finely ground, milled or powdered tobacco lamina. Tobacco beads, pellets, or other solid forms may be included, such as described in U.S. Pat. App. Pub. No. 2015/0335070 to Sears et al., the disclosure of which is incorporated herein by reference in its entirety. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine, USP/EP nicotine, etc.). In other implementations, non-tobacco materials alone may form the aerosol precursor composition. In some implementations, the aerosol precursor composition may include tobacco-extracted nicotine with tobacco or non-tobacco flavors and/or non-tobacco-extracted nicotine with tobacco or non-tobacco flavors.

In the depicted implementation, the liquid composition, sometimes referred to as an aerosol precursor composition or a vapor precursor composition or "e-liquid", may comprise a variety of components, which may include, by way of example, a polyhydric alcohol (e.g., glycerin, propylene glycol, or a mixture thereof), nicotine, tobacco, tobacco extract, and/or flavorants. Representative types of aerosol precursor components and formulations are also set forth and characterized in U.S. Pat. No. 7,217,320 to Robinson et al. and U.S. Pat. App. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference in their entireties. Other aerosol precursors that may be employed include the aerosol precursors that have been incorporated in VUSE® products by R. J. Reynolds Vapor Company, the BUJ' products by Fontem Ventures B.V., the MISTIC MENTHOL product by Mistic Ecigs, MARK TEN products by Nu Mark LLC, the JUUL product by Juul Labs, Inc., and VYPE products by CN Creative Ltd. Also desirable are the so-called "smoke juices" for electronic cigarettes that have been available from Johnson Creek Enterprises LLC. Still further example aerosol precursor compositions are sold under the brand names BLACK NOTE, COSMIC FOG, THE MILKMAN E-LIQUID, FIVE PAWNS, THE VAPOR CHEF, VAPE WILD, BOOSTED, THE STEAM FACTORY, MECH SAUCE, CASEY JONES MAINLINE RESERVE, MITTEN VAPORS, DR. CRIMMY'S V-LIQUID, SMILEY E LIQUID, BEANTOWN VAPOR, CUTTWOOD, CYCLOPS VAPOR, SICBOY, GOOD LIFE VAPOR, TELEOS, PINUP VAPORS, SPACE JAM, MT. BAKER VAPOR, and JIMMY THE JUICE MAN.

The amount of aerosol precursor composition that is incorporated within the aerosol delivery system is such that the aerosol generating device provides acceptable sensory and desirable performance characteristics. For example, it is highly preferred that sufficient amounts of aerosol forming material (e.g., glycerin and/or propylene glycol), be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating device. In one or more embodiments, about 1 ml or more, about 2 ml or more, about 5 ml or more, or about 10 ml or more of the aerosol precursor composition may be included.

In the some of the examples described above, the aerosol precursor composition comprises a glycerol-based liquid. In other implementations, however, the aerosol precursor composition may be a water-based liquid. In some implementations, the water-based liquid may be comprised of more than approximately 80% water. For example, in some implementations the percentage of water in the water-based liquid may be in the inclusive range of approximately 90% to approximately 93%. In some implementations, the water-based liquid may include up to approximately 10% propylene glycol. For example, in some implementations the percentage of propylene glycol in the water-based liquid may be in the inclusive range of approximately 4% to approximately 5%. In some implementations, the water-based liquid may include up to approximately 10% flavorant. For example, in some implementations the percentage of flavorant(s) of the water-based liquid may be in the inclusive range of approximately 3% to approximately 7%. In some implementations, the water-based liquid may include up to approximately 1% nicotine. For example, in some implementations the percentage nicotine in the water-based liquid may be in the inclusive range of approximately 0.1% to approximately 1%. In some implementations, the water-based liquid may include up to approximately 10% cyclodextrin. For example, in some implementations the percentage cyclodextrin in the water-based liquid may be in the inclusive range of approximately 3% to 5%. In still other implementations, the aerosol precursor composition may be a combination of a glycerol-based liquid and a water-based liquid. For example, some implementations may include up to approximately 50% water and less than approximately 20% glycerol. The remaining components may include one or more of propylene glycol, flavorants, nicotine, cyclodextrin, etc. Some examples of water-based liquid compositions that may be suitable are disclosed in GB 1817863.2, filed Nov. 1, 2018, titled Aerosolisable Formulation; GB 1817864.0, filed Nov. 1, 2018, titled Aerosolisable Formulation; GB 1817867.3, filed Nov. 1, 2018, titled Aerosolisable Formulation; GB 1817865.7, filed Nov. 1, 2018, titled Aerosolisable Formulation; GB 1817859.0, filed Nov. 1, 2018, titled Aerosolisable Formulation; GB 1817866.5, filed Nov. 1, 2018, titled Aerosolisable Formulation; GB 1817861.6, filed Nov. 1, 2018, titled Gel and Crystalline Powder; GB 1817862.4, filed Nov. 1, 2018, titled Aerosolisable Formulation; GB 1817868.1, filed Nov. 1, 2018, titled Aerosolised Formulation; and GB 1817860.8, filed Nov. 1, 2018, titled Aerosolised Formulation, each of which is incorporated by reference herein in its entirety.

In some implementations, the aerosol precursor composition may incorporate nicotine, which may be present in various concentrations. The source of nicotine may vary, and the nicotine incorporated in the aerosol precursor composition may derive from a single source or a combination of two or more sources. For example, in some implementations the aerosol precursor composition may include nicotine derived from tobacco. In other implementations, the aerosol precursor composition may include nicotine derived from other organic plant sources, such as, for example, non-tobacco plant sources including plants in the Solanaceae family. In other implementations, the aerosol precursor composition may include synthetic nicotine. The aerosol precursor composition may additionally or alternatively include other active ingredients including, but not limited to, botanical ingredients (e.g., lavender, peppermint, chamomile, basil, rosemary, thyme, eucalyptus, ginger, cannabis, ginseng, maca, and tisanes), stimulants (e.g., caffeine and guarana), amino acids (e.g., taurine, theanine, phenylalanine, tyrosine, and tryptophan) and/or pharmaceutical, nutraceutical, and medicinal ingredients (e.g., vitamins, such as B6, B12, and C and cannabinoids, such as tetrahydrocannabinol (THC) and cannabidiol (CBD)).

As noted above, in various implementations, the liquid composition may include a flavorant. In some implementations, the flavorant may be pre-mixed with the liquid. In other implementations, the flavorant may be delivered separately downstream from the atomizer as a main or secondary flavor. Still other implementations may combine a pre-mixed flavorant with a downstream flavorant. As used herein, reference to a "flavorant" refers to compounds or components that can be aerosolized and delivered to a user and which impart a sensory experience in terms of taste and/or aroma. Example flavorants include, but are not limited to, vanillin, ethyl vanillin, cream, tea, coffee, fruit (e.g., apple, cherry, strawberry, peach and citrus flavors, including lime, lemon, mango, and other citrus flavors), maple, menthol, mint, peppermint, spearmint, wintergreen, nutmeg, clove, lavender, cardamom, ginger, honey, anise, sage, rosemary, hibiscus, rose hip, yerba mate, guayusa, honeybush, rooibos, amaretto, mojito, yerba santa, ginseng, chamomile, turmeric, bacopa monniera, gingko biloba, withania somnifera, cinnamon, sandalwood, jasmine, cascarilla, cocoa, licorice, and flavorings and flavor packages of the type and character traditionally used for the flavoring of cigarette, cigar, and pipe tobaccos. Other examples include flavorants derived from, or simulating, burley, oriental tobacco, flue cured tobacco, etc. Syrups, such as high fructose corn syrup, also can be employed. Example plant-derived compositions that may be suitable are disclosed in U.S. Pat. No. 9,107,453 and U.S. Pat. App. Pub. No. 2012/0152265 both to Dube et al., the disclosures of which are incorporated herein by reference in their entireties. The selection of such further components are variable based upon factors such as the sensory characteristics that are desired for the smoking article, and the present disclosure is intended to encompass any such further components that are readily apparent to those skilled in the art of tobacco and tobacco-related or tobacco-derived products. See, e.g., Gutcho, Tobacco Flavoring Substances and Methods, Noyes Data Corp. (1972) and Leffingwell et al., Tobacco Flavoring for Smoking Products (1972), the disclosures of which are incorporated herein by reference in their entireties. It should be noted that reference to a flavorant should not be limited to any single flavorant as described above, and may, in fact, represent a combination of one or more flavorants.

Referring back to FIG. 2, the reservoir 144 of the depicted implementation is in fluid communication with at least a portion of an atomization assembly 115 via one or more additional components. In some implementations, the reservoir 144 may comprise an independent container (e.g., formed of walls substantially impermeable to the liquid composition). In some implementations, the walls of the reservoir may be flexible and/or collapsible, while in other implementations the walls of the reservoir may be substantially rigid. In some implementations, the reservoir may be substantially sealed to prevent passage of the liquid composition therefrom except via any specific openings or conduits provided expressly for passage of the liquid composition, such as through one or more transport elements as otherwise described herein.

In the depicted implementation, an electrical connection 116 connects the atomization assembly 115 to the base 140 of the cartridge 104, which, when assembled to the control unit 102, provides an electrical connection to the control component 106 and/or the power source 110. As noted, the atomization assembly 115 is configured to be electrically connected to the power source 110 and/or the control component 106. In such a manner, the atomization assembly 115 of the depicted implementation may be energized by the power source 110 and/or control component 106. In the depicted implementation, the atomization assembly 115 includes a piezoelectric component 155 configured to generate surface acoustic waves that vaporize (e.g., aerosolize, etc.) at least a portion of the liquid composition to generate an aerosol. In the depicted implementation, the atomization assembly 115 is fluidly coupled with at least a portion of the liquid composition in the reservoir 144 via a liquid transport element 165. In the depicted implementation, the control unit housing 101 includes an air intake 118, which may comprise an opening in the housing proximate the coupler 124 allowing for passage of ambient air into the control unit housing 101 where it then passes through the cavity 125 of the coupler 124, and eventually into or around the atomization assembly 115, where it may be mixed with the vaporized liquid composition to comprise the aerosol that is delivered to the user. It should be noted that in other implementations the air intake 118 is not limited being on or adjacent the control unit housing 101. For example, in some implementations, an air intake may be formed through the cartridge housing 103 (e.g., such that it does not enter the control unit 102) or some other portion of the aerosol delivery device 100. In the depicted implementation, a mouthpiece portion that includes an opening 128 may be present in the cartridge housing 103 (e.g., at a mouthend of the cartridge 104) to allow for egress of the formed aerosol from the cartridge 104, such as for delivery to a user drawing on the mouthend of the cartridge 104.

In various implementations, the cartridge 104 may also include at least one electronic component 150, which may include an integrated circuit, a memory component, a sensor, or the like, although such a component need not be included. In those implementations that include such a component, the electronic component 150 may be adapted to communicate with the control component 106 and/or with an external device by wired or wireless means. In various implementations, the electronic component 150 may be positioned anywhere within the cartridge 104 or its base 140. Some examples of electronic/control components that may be applicable to the present disclosure are described in U.S. Pat. App. Pub. No. 2019/0014819 to Sur, which is incorporated herein by reference in its entirety. Although in the depicted implementation the control component 106 and the flow sensor 108 are illustrated separately, it should be noted that in some implementations the control component and the flow sensor may be combined as an electronic circuit board with the air flow sensor attached directly thereto. In some embodiments, the air flow sensor may comprise its own circuit board or other base element to which it can be attached. In some embodiments, a flexible circuit board may be utilized. A flexible circuit board may be configured into a variety of shapes, include substantially tubular shapes. Configurations of a printed circuit board and a pressure sensor, for example, are described in U.S. Pat. App. Pub. No. 2015/0245658 to Worm et al., the disclosure of which is incorporated herein by reference. Additional types of sensing or detection mechanisms, structures, and configuration thereof, components thereof, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference in their entireties.

In some implementations, when a user draws on the article 100, airflow may be detected by the sensor 108, and the atomization assembly 115 may be activated, which may vaporize the liquid composition. As noted above, in some implementations drawing upon the mouthend of the article 100 causes ambient air to enter the air intake 118 and pass through the cavity 125 in the coupler 124 and the base 140. In the cartridge 104, the drawn air combines with the formed vapor to form the aerosol. The aerosol is whisked, aspirated, or otherwise drawn away from the atomization assembly 115 and out of the mouth opening 128 in the mouthend of the article 100. As noted, in other implementations, in the absence of an airflow sensor, the atomization assembly 115 may be activated manually, such as by a push button (not shown). Additionally, in some implementations, the air intake may occur through the cartridge or between the cartridge and the control unit. It should be noted that in some implementations, there may be one or more components between the atomization assembly and the opening in the mouthend of the article. For example, in some implementations there may be a heating component located downstream from the atomization assembly. In various implementations, the heating component may comprise any device configured to elevate the temperature of the generated aerosol, including, for example, one or more coil heating components, ceramic heating components, etc.

In some implementations, one or more input elements may be included with the aerosol delivery device (and may replace or supplement an airflow sensor, pressure sensor, or manual push button). In various implementations, an input element may be included to allow a user to control functions of the device and/or for output of information to a user. Any component or combination of components may be utilized as an input for controlling the function of the device. For example, one or more pushbuttons may be used as described in U.S. Pat. App. Pub. No. 2015/0245658 to Worm et al., which is incorporated herein by reference in its entirety. Likewise, a touchscreen may be used as described in U.S. Pat. App. Pub. No. 2016/0262454, to Sears et al., which is incorporated herein by reference in its entirety. As a further example, components adapted for gesture recognition based on specified movements of the aerosol delivery device may be used as an input. See U.S. App. Pub. No. 2016/0158782 to Henry et al., which is incorporated herein by reference in its entirety. As still a further example, a capacitive sensor may be implemented on the aerosol delivery device to enable a user to provide input, such as by touching a surface of the device on which the capacitive sensor is implemented.

In some implementations, an input element may comprise a computer or computing device, such as a smartphone or tablet. In particular, the aerosol delivery device may be wired to the computer or other device, such as via use of a USB cord or similar protocol. The aerosol delivery device also may communicate with a computer or other device acting as an input via wireless communication. See, for example, the systems and methods for controlling a device via a read request as described in U.S. Pat. App. Pub. No. 2016/0007561 to Ampolini et al., the disclosure of which is incorporated herein by reference in its entirety. In such implementations, an APP or other computer program may be used in connection with a computer or other computing device to input control instructions to the aerosol delivery device, such control instructions including, for example, the ability to form an aerosol of specific composition by choosing the nicotine content and/or content of further flavors to be included.

Yet other features, controls or components that may be incorporated into aerosol delivery systems of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. App. Pub. Nos. 2010/0163063 to Fernando et al.; 2013/0192623 to Tucker et al.; 2013/0298905 to Leven et al.; 2013/0180553 to Kim et al., 2014/0000638 to Sebastian et al., 2014/0261495 to Novak et al., and 2014/0261408 to DePiano et al.; which are incorporated herein by reference in their entireties.

In the depicted implementation, the atomization assembly 115 comprises a piezoelectric component configured to generate surface acoustic (ultrasonic) waves (SAWs) that vaporize the liquid composition to generate an aerosol. In general, SAWs may be produced by applying an appropriate electric field to the piezoelectric component. The piezoelectric component, in turn, generates propagating mechanical stress. In some implementations, the piezoelectric component comprises a bulk piezoelectric material such as a piezoceramic. In some implementations, the piezoceramic may be in the form of a disk or a ring. In some implementations, instead of using a bulk piezoelectric material, a thin film of piezoelectric material may be deposited on the surface of a substrate. For example, in some implementations a thin layer of ZnO may be fabricated on the surface of a silicon substrate. In various implementations, the piezoelectric component may operate at Mega-Giga Hertz scale frequency to generate surface acoustic waves that can atomize a thin film of liquid composition deposited on the surface of the piezoelectric component.

Figure 3:
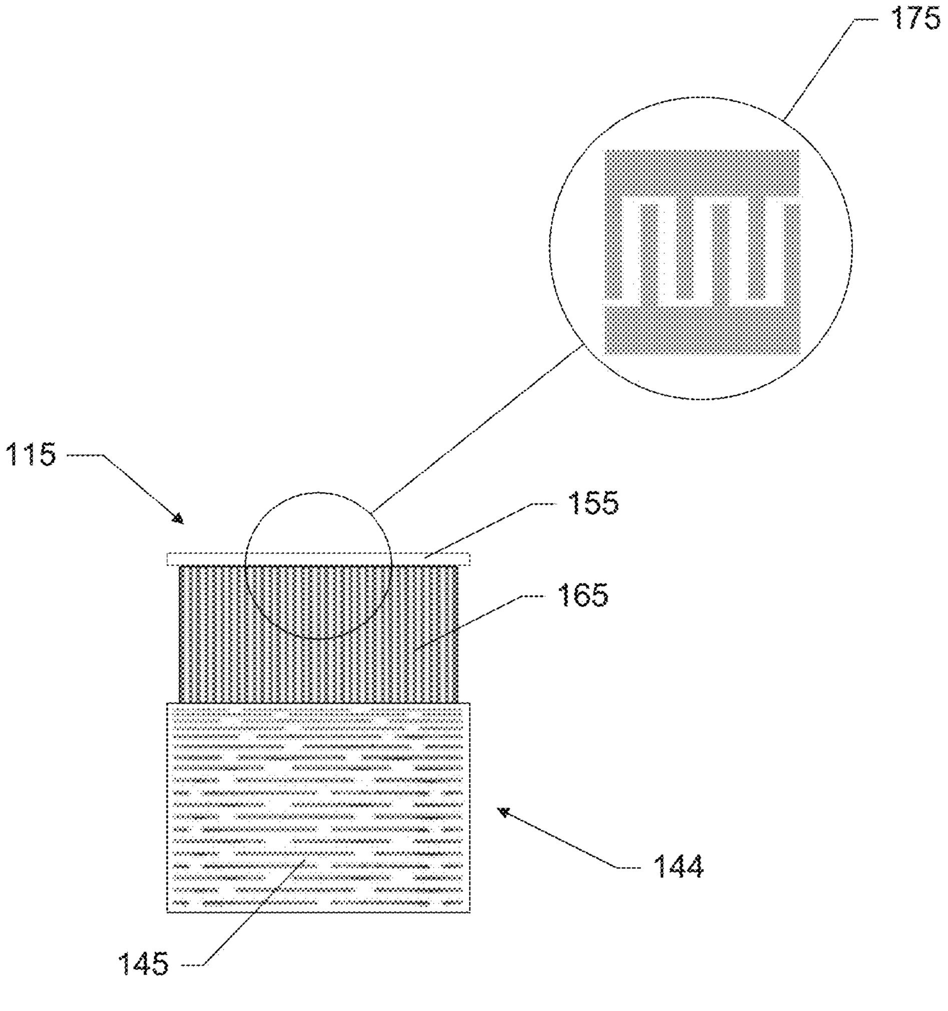
FIG. 3 illustrates a side schematic view of a liquid delivery and atomization assembly for use with an aerosol delivery device, according to an example implementation of the present disclosure.

In various implementations, a variety of different piezoelectric components are possible, including natural or synthetic materials. Some non-limiting examples of natural piezoelectric materials include, for example, quartz, berlinite ($AlPO_4$), sucrose, rochelle salt, topaz, tourmaline-group minerals, lead titanate ($PbTiO_3$), and collagen. Some non-limiting examples of synthetic materials include, for example, a ($La_3Ga_5SiO_{14}$), gallium phosphate, gallium orthophosphate ($GaPO_4$), lithium niobate ($LiNbO_3$), lithium tantalate ($LiTaO_3$), AlN, ZnO, barium titanate ($BaTiO_3$), lead zirconate titanate ($Pb[Zr_xTi_{1-x}]O_3$) (a.k.a. PZT), potassium niobate ($KNbO_3$), sodium tungstate ($Na_2WO_3$), $Ba_2NaNb_5O_5$, $Pb_2KNb_5O_{15}$, zinc oxide (ZnO), sodium potassium niobate ($(K,Na)NbO_3$) (a.k.a. NKN), bismuth ferrite ($BiFeO_3$), sodium niobate $NaNbO_3$, barium titanate ($BaTiO_3$), bismuth titanate $Bi_4Ti_3O_{12}$, sodium titanate, and sodium bismuth titanate $NaBi(TiO_3)_2$. In other implementations, polymers exhibiting piezoelectric characteristics may be used, including, but not limited to, polyvinylidene fluoride (PVDF). FIG. 3 illustrates a side schematic view of a liquid delivery and atomization assembly for use with an aerosol delivery device. In particular, the figure illustrates a schematic view of the reservoir 144 containing the liquid composition 145, the liquid transport element 165, and the piezoelectric component 155 of FIG. 2. In the depicted implementation, the piezoelectric component 155 includes an interdigital transducer (IDT) 175. In general, an IDT comprises at least two interlocking metallic finger-shaped arrays of electrodes (e.g., a set of connected metallic fingers interspaced with an opposite set of connected metallic fingers). In some implementations, when an IDT is activated, the IDT introduces an electric field (e.g., an alternating current electrical signal in the radiofrequency (RF) range is applied across the two sets of connected fingers), generating a SAW displacement amplitude on the order of 10 Å. In various implementations, the structure of the IDT may determine the bandwidth and directivity of the generated SAW. For example, by changing the number, spacing, and/or aperture (overlapping length) of the metallic fingers, one may change the characteristics of the resulting SAW.

In the depicted implementation, the liquid transport element 165 comprises a fibrous material with fibers having a multi-lobal cross-section. It should be understood that the terms “multi-lobal fiber” and “fiber having a multi-lobal cross-section” are meant to be interchangeable. In some implementations, a multi-lobal fiber can be a fiber that, in cross-section, includes a common base or hub (typically at about a central portion of the cross-section of the fiber) with at least three lobes or spokes extending therefrom. A multi-lobal fiber may further be defined as a fiber having three or more extensions such that at least one set of adjacent extensions form an angle of less than 180 degrees and thereby define one or more channels extending longitudinally along the fiber. An example of such a material is the 4DG™ fiber material (available from Fiber Innovation Technology). In various implementations, the liquid transport element may be fabricated in the form of woven, nonwoven, knitted, etc. In various implementations, a liquid transport element may have one layer, or multiple layers, and may be made of a single material or multiple materials. In some implementations, the liquid transport element may be any shape and may be a porous, semi-porous, or non-porous absorbent/adsorbent material. In other implementations, there may be a second liquid transport element located between the first liquid transport element and the reservoir, the second liquid transport element being configured to transfer liquid from the reservoir to the first liquid transport element. In such a manner, the first liquid transport element may not be in direct contact with the liquid in the reservoir. In various implementations, the second liquid transport element may be made of the same material or a different material than the first liquid transport element and may have a shape that is the same or differs from that of the first liquid transport element. In some implementations in which one or more components may be replaceable, the material of the first and second liquid transport elements may be selected based on component replaceability. For example, in one implementation one of the liquid transport elements may be made of a ceramic wick, which may not be replaced or which may be replaced less frequently than the other liquid transport element, which may be made of a fibrous material and may be replaced more regularly. Some implementations may include other replacement components, such as, for example, a reservoir and/or a piezoelectric component. In such a manner, the aerosol delivery device may be designed such that the replaceable components may be replaced together.

In some implementations, the piezoelectric component may be in the shape of a cylinder. In such implementations, one or more interdigital transducers (IDTs) may be located on either or both the inside or outside surface of the cylinder. In some implementations, the liquid transport element may also be in the form a cylinder, which may cover, either fully or partially, the inside and/or the outside surface.

Figure 4:
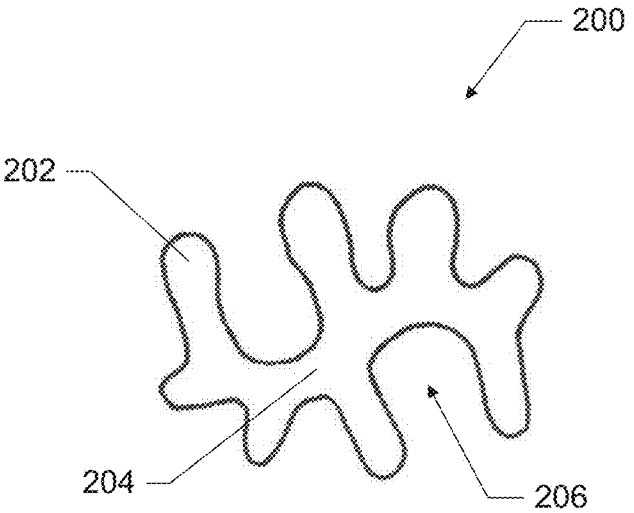
FIG. 4 illustrates a cross-section of a liquid transport element fiber, according to an example implementation of the present disclosure.

FIG. 4 illustrates a cross-section of a liquid transport element fiber, according to one example implementation of the present invention. In particular, FIG. 4 illustrates a multi-lobal fiber 200 that includes a plurality of lobes 202 extending from a central portion or hub 204 and a plurality of channels 206 that are formed between the adjacent lobes 202. In various implementations, the lobes of a multi-lobal fiber can have a variety of shapes, lengths, sizes, etc. For example, in some implementations the plurality of lobes may be substantially rounded while still forming a plurality of channels between adjacent lobes. In some implementations, the multi-lobal fiber may form an “X” or “Y” shaped cross-section. The number of lobes can vary and can be for example, 3 to 30, 3 to 20, or 3 to 10. Likewise, the spacing between lobes and the size of the lobes in the same fiber can vary. In the depicted implementation, the multi-lobal fiber 200 has a cross-section that is substantially elongated so as to allow for a greater number of lobes 202 and thus a greater number of channels 206 between the adjacent lobes 202. In the depicted implementation, the multi-lobal fiber 200 includes eight (8) lobes 202, which form eight (8) channels 206 therebetween. In some implementations, the multi-lobal fibers may include surface features that may further improve the liquid handling properties thereof.

In other implementations, a liquid transport element may be made of fibrous materials (e.g., organic cotton, cellulose acetate, regenerated cellulose fabrics, glass fibers), polymers, silk, particles, porous ceramics (e.g., alumina, silica, zirconia, SiC, SiN, AlN, etc.), porous metals, porous carbon, graphite, porous glass, sintered glass beads, sintered ceramic beads, capillary tubes, porous polymers, or the like. In some implementations, the liquid transport element may be any material that contains an open pore network (i.e., a plurality of pores that are interconnected so that fluid may flow from one pore to another in a plurality of direction through the element). The pores can be nanopores, micropores, macropores or combinations thereof. As further discussed herein, some implementations of the present disclosure may particularly relate to the use of non-fibrous transport elements. As such, fibrous transport elements may be expressly excluded. Alternatively, combinations of fibrous transport elements and non-fibrous transport elements may be utilized. In some embodiments, the liquid transport element may be a substantially solid non-porous material, such as a polymer or dense ceramic or metals, or superabsorbent polymers, configured to channel liquid through apertures or slots while not necessarily relying upon wicking through capillary action. Such a solid body may be used in combination with a porous absorptive pad. The absorptive pad may be formed of silica-based fibers, organic cotton, rayon fibers, cellulose acetate, regenerated cellulose fabrics, highly porous ceramic or metal mesh, etc. In some implementations, the liquid transport element may comprise a mutli-lobal ceramic or other material (such as any one or combination of the materials described above) that may be formed through an extrusion technique.

Some representative types of substrates, reservoirs or other components for supporting the aerosol precursor are described in U.S. Pat. No. 8,528,569 to Newton; U.S. Pat. App. Pub. Nos. 2014/0261487 to Chapman et al. and 2014/0059780 to Davis et al.; and U.S. Pat. App. Pub. No. 2015/0216232 to Bless et al.; which are incorporated herein by reference in their entireties. Additionally, various wicking materials, and the configuration and operation of those wicking materials within certain types of electronic cigarettes, are set forth in U.S. Pat. No. 8,910,640 to Sears et al.; which is incorporated herein by reference in its entirety. In various implementations, woven and/or non-woven aramid fibers may be utilized in a liquid transport element. In some implementations, the liquid transport element may be formed partially or completely from a porous monolith, such as a porous ceramic, a porous glass, or the like. Example monolithic materials that may be suitable for use according to embodiments of the present disclosure are described, for example, in U.S. Pat. App. Pub. No. 2017/0188626 to Davis et al., and U.S. Pat. App. Pub. No. 2014/0123989 to LaMothe, the disclosures of which are incorporated herein by reference in their entireties. In some implementations, the porous monolith may form a substantially solid wick.

Figure 6:
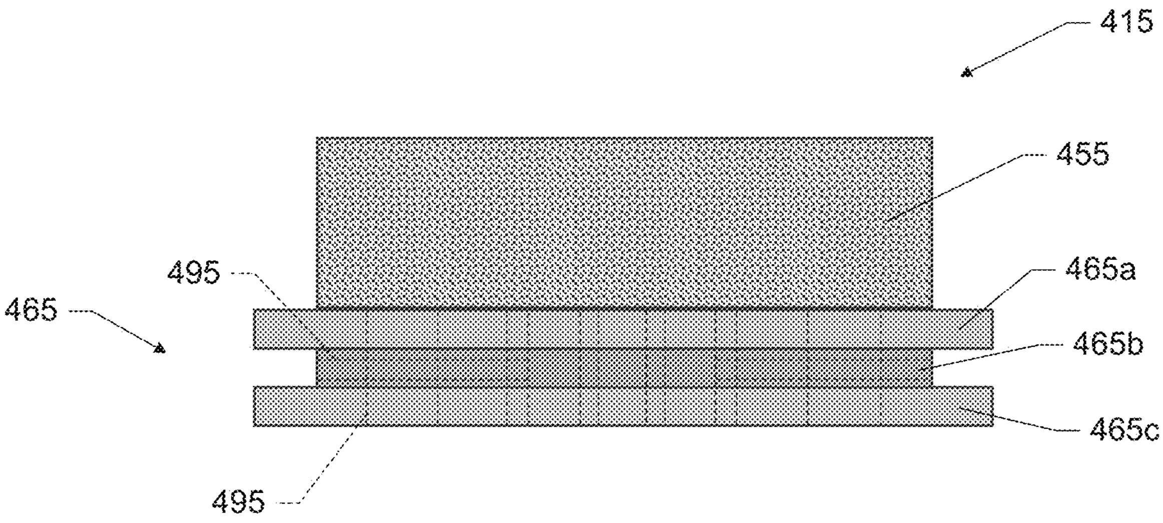
FIG. 6 illustrates a side view of a liquid delivery and atomization assembly, in accordance with an example implementation of the present disclosure.
Figure 7:
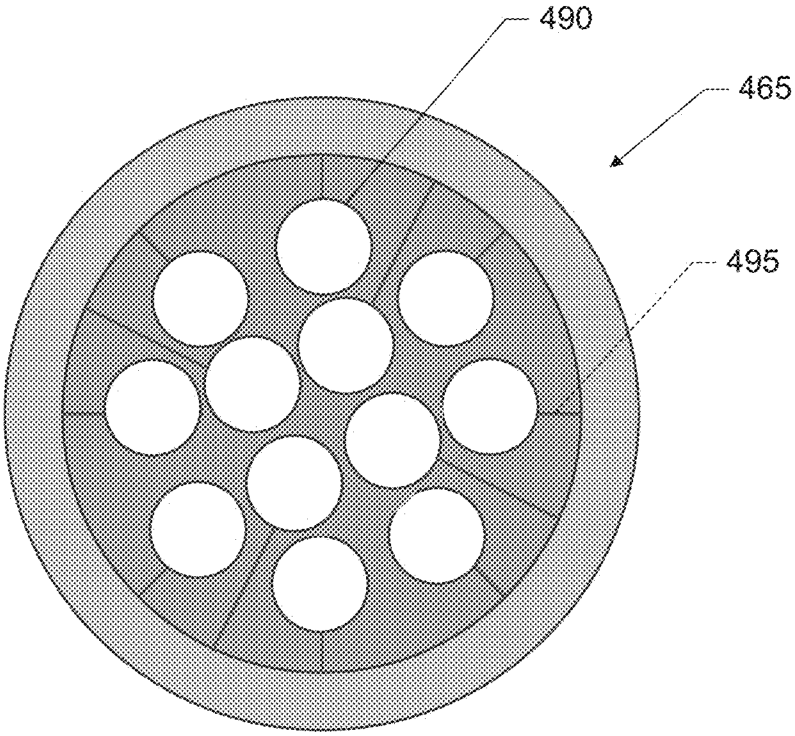
FIG. 7 illustrates a top view of a liquid transport disk of a liquid delivery and atomization assembly, in accordance with an example implementation of the present disclosure.
Figure 8:
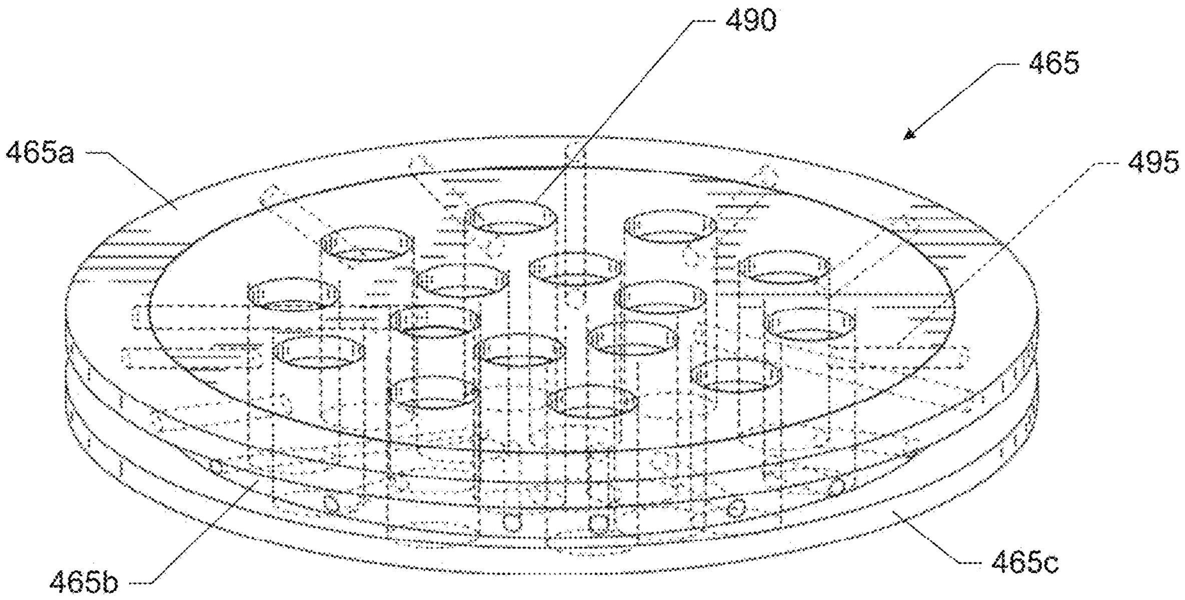
FIG. 8 illustrates a perspective view of a liquid transport disk of a liquid delivery and atomization assembly, in accordance with an example implementation of the present disclosure.

In some implementations, microchannels may be embedded on the surface of the piezoelectric component itself and may be treated to be easily wetted by the liquid composition to facilitate wicking and liquid delivery. In other implementations, microchannels may be embedded as microfluidic channels in a perforated disk or a perforated ring that may be coupled with the piezoelectric component for quick/efficient delivery of the liquid composition to the piezo component surface. FIGS. 6, 7, and 8 illustrate examples of such a configuration. In particular, FIG. 6 depicts a side view of a liquid delivery and atomization assembly configured to be electrically connected to a power source and/or a control component and that receives at least a portion of a liquid composition from a reservoir. FIG. 7 illustrates a top view of a liquid transport disk of the atomization assembly of FIG. 7; and FIG. 8 illustrates a perspective view of the liquid transport disk of FIG. 7. In particular, the depicted implementation illustrates an atomization assembly 415 that includes a piezoelectric component 455 configured to generate surface acoustic waves that vaporize at least a portion of the liquid composition to generate an aerosol. In the depicted implementation, the atomization assembly 415 is fluidly coupled with at least a portion of a liquid composition in a reservoir via a liquid transport disk 465. In the depicted implementation, the liquid transport disk 465 comprises a perforated disk that includes an upper disk 465*a*, a lower disk 465*c*, and an inner disk 465*b* sandwiched between the upper disk 465*a* and the lower disk 465*c*. Although other configurations are possible, in the depicted implementation the upper and lower disks 465*a*, 465*c* have substantially the same overall diameter, while the inner disk 465*b* has a diameter less than that of the upper and lower disks 465*a*, 465*c*. Although in other implementations, the configuration may be different, in the depicted implementation a plurality of openings 490 extend substantially perpendicularly through the upper disk 465*a*, inner disk 465*b*, and the lower disk 465*c* such that liquid may travel through the openings 490 for delivery to the piezoelectric component 455. In some implementations, the openings 490 may be closed on one end so as to direct the liquid composition to the piezoelectric component 455. In the depicted implementation, a plurality of channels 495 (e.g., a plurality of microchannels) extend from an outer periphery of the inner disk 465*b* to respective ones of the plurality of openings 490. In such a manner, liquid composition may be transported from the periphery of the liquid transport disk 465 to the openings 490 for delivery to the piezoelectric component 455. As such, in some implementations the sides of the inner disk 465*b* may be in contact with the liquid composition and may be configured to deliver liquid composition to the openings 490 via the respective channels 495. In some implementations, another liquid transport element, such as one or more of those described above, may be in fluid communication with a liquid transport disk, such as, for example, proximate the ends of the openings opposite the piezoelectric component. In some implementations other delivery devices, such as, for example, one or more micropumps, may be used for liquid delivery from a reservoir to the piezoelectric component and/or the liquid transport disk.

In some implementations, a sealing arrangement may exist proximate the interface of the piezoelectric component and the liquid transport element. For example, in some implementations a sealing member may surround at least a portion of the liquid transport element and/or the piezoelectric component proximate the interface thereof. In various implementations, the sealing member may engage the liquid transport element and/or the piezoelectric component in a variety of manners. In some implementations, only a single sealing member may be utilized. In other implementations, a plurality of sealing members may be utilized. In various implementations, the sealing member may be formed of any suitable sealant such as silicone, rubber, or other resilient material.

In some implementations, in addition to aerosolization of the liquid composition via surface acoustic wave generation, aerosolization may occur via one or more heating arrangements, which in some implementations may heat the piezoelectric component in order to aerosolize a portion of the liquid composition. As will described in more detail below, in various implementations such a heating arrangement may include, but need not be limited to, an inductive heating arrangement, a resistive heating arrangement, and/or a microwave heating arrangement. In one implementation, an inductive heating arrangement may comprise a resonant transmitter and a resonant receiver (e.g., one or more susceptors, or a plurality of susceptor particles). In such a manner, operation of the aerosol delivery device may require directing alternating current to the resonant transmitter to produce an oscillating magnetic field in order to induce eddy currents in the resonant receiver. In some implementations, the resonant transmitter may comprise a helical coil, and the resonant receiver may be part of the liquid delivery and atomization assembly of the aerosol delivery device. For example, in some implementations the resonant receiver may be part of the atomization assembly (such as, for example, the piezoelectric component) and/or the liquid transport element.

In various implementations, at least a portion of the piezoelectric component may be coated with one or more materials (e.g., ferromagnetic and/or non-ferromagnetic materials) configured to generate heat using a resonant transmitter, such as an induction coil. For example, in some implementations at least a portion of the piezoelectric component may be coated with ferromagnetic materials including, but not limited to, cobalt, iron, nickel, zinc, manganese, and any combinations thereof. In other implementations, the piezoelectric component may be coated with metal materials such as, but not limited to, aluminum or stainless steel, as well as ceramic materials such as, but not limited to, silicon carbide, carbon materials, and any combinations of any of the materials described above. In still other implementations, the materials may comprise other conductive materials including metals such as copper, alloys of conductive materials, or other materials with one or more conductive materials imbedded therein. In such a manner, atomization assemblies of some implementations may generate aerosol using both surface acoustic waves and thermal energy, simultaneously or individually. It should be noted that in some implementations, instead of a coating, one or more of the abovementioned materials may be loaded into the bulk piezoelectric component and/or in the form of macro/micro/nano-particles.

Figure 5:
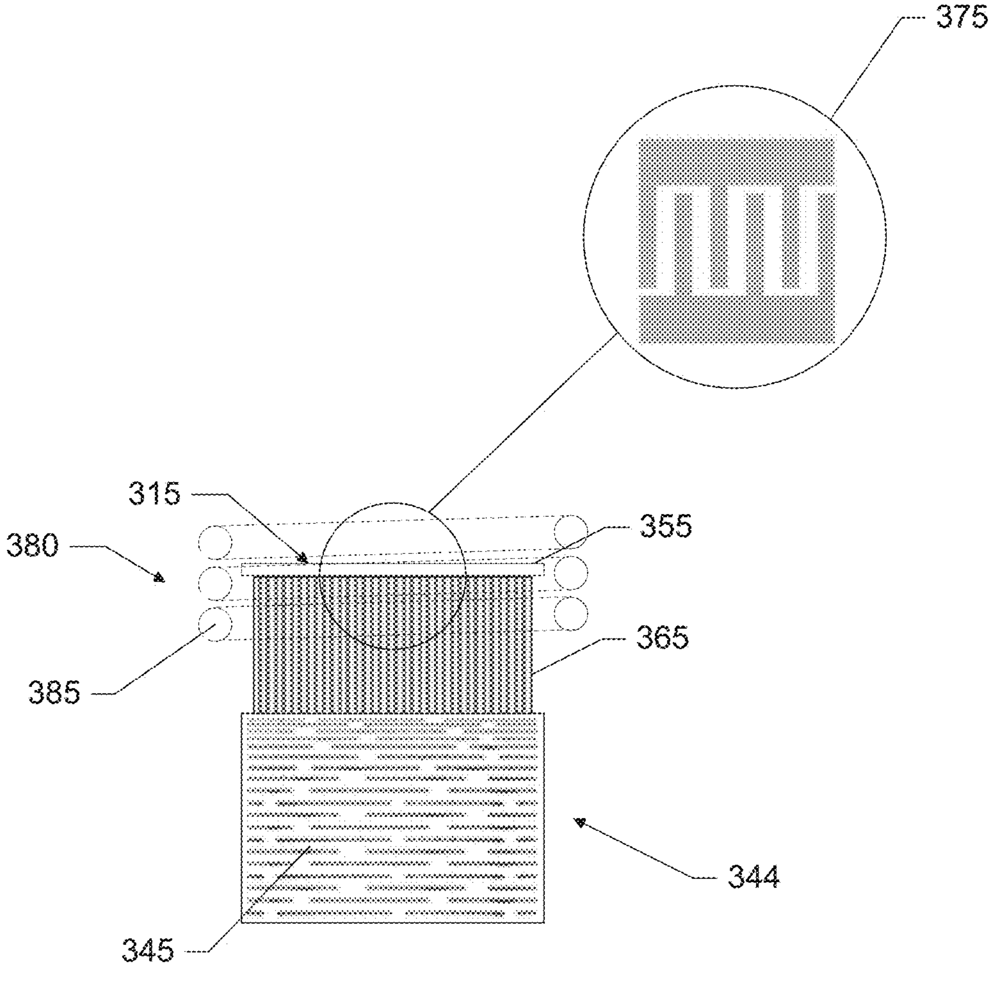
FIG. 5 illustrates a side schematic view of a liquid delivery and atomization assembly for use with an aerosol delivery device, according to an example implementation of the present disclosure.

An example of an inductive heating arrangement is depicted in FIG. 5. In particular, FIG. 5 illustrates a side schematic view of a liquid delivery and atomization assembly for use with an aerosol delivery device, in accordance with an example implementation of the present invention. In particular, the figure illustrates a schematic view of a reservoir 344 containing a liquid composition 345, a liquid transport element 365, and a piezoelectric component 355, which includes an interdigital transducer (IDT) 375. Reference is made to the above descriptions of these components (and possible variations thereof), which will not be repeated here. The depicted implementation also includes an induction heating arrangement 380. In the depicted implementation, the piezoelectric component 355, or a portion thereof, comprises the resonant receiver of the induction heating arrangement 380, and a helical coil 385 comprises the resonant transmitter of the induction heating arrangement 380. As such, the depicted implementation is configured to generate an aerosol using both surface acoustic waves and thermal energy. In various implementations, control of the induction heating arrangement may occur via the control component of the aerosol delivery device. As noted, in some implementations the piezoelectric component and the induction heating arrangement may operate simultaneously. In other implementations, however, the piezoelectric component and the induction heating arrangement may be controllable independently. In some implementations, control may be switchable between the piezoelectric component and the induction heating arrangement such that sometimes one or the other of the piezoelectric component or the induction heating arrangement may operate independently, and at other times the piezoelectric component and the induction heating arrangement may operate simultaneously.

In other implementations, a heating arrangement may comprise a resistive heating arrangement, which, in some implementations, may heat the piezoelectric component. Some examples of resistive heating components are contained in U.S. Pat. App. Pub. No. 2019/0274354 to Sur et al., and U.S. application Ser. No. 16/110,223, filed on Aug. 23, 2018, and titled Aerosol Delivery Device with Segmented Electrical Heater, each of which is incorporated by reference herein in its entirety. In other implementations, a heating arrangement may comprise a microwave heating arrangement that may heat the piezoelectric component. For example, in some implementations a microwave heating arrangement may include a magnetron configured to generate microwave radiation. In other implementations, a microwave heating arrangement may include a solid state microwave emitting chip to generate microwave radiation. In some implementations, one or more wave guides may be used to direct emitted microwaves. Some examples of microwave heating components are contained in U.S. Pat. App. Pub. No. 2019/0208818 to Sparklin et al., which is incorporated by reference herein in its entirety.

In addition to, or as an alternative to, heating arrangements that heat the piezoelectric component, some implementations may include one or more heating arrangements that heat the liquid transport element. These heating arrangements may include any one, or any combination of, the heating arrangements described above, including, for example, an inductive heating arrangement, a resistive heating arrangement, and/or a microwave heating arrangement. For example, in some inductive heating arrangement implementations a susceptor material may be included in a core of the liquid transport element and/or a portion of the liquid transport element may be coated with a susceptor material. In particular, a liquid transport element of one implementation may include one or more metalized fibers incorporated (e.g., by being intertwined) with the liquid transport element fibers.

Figure 9:
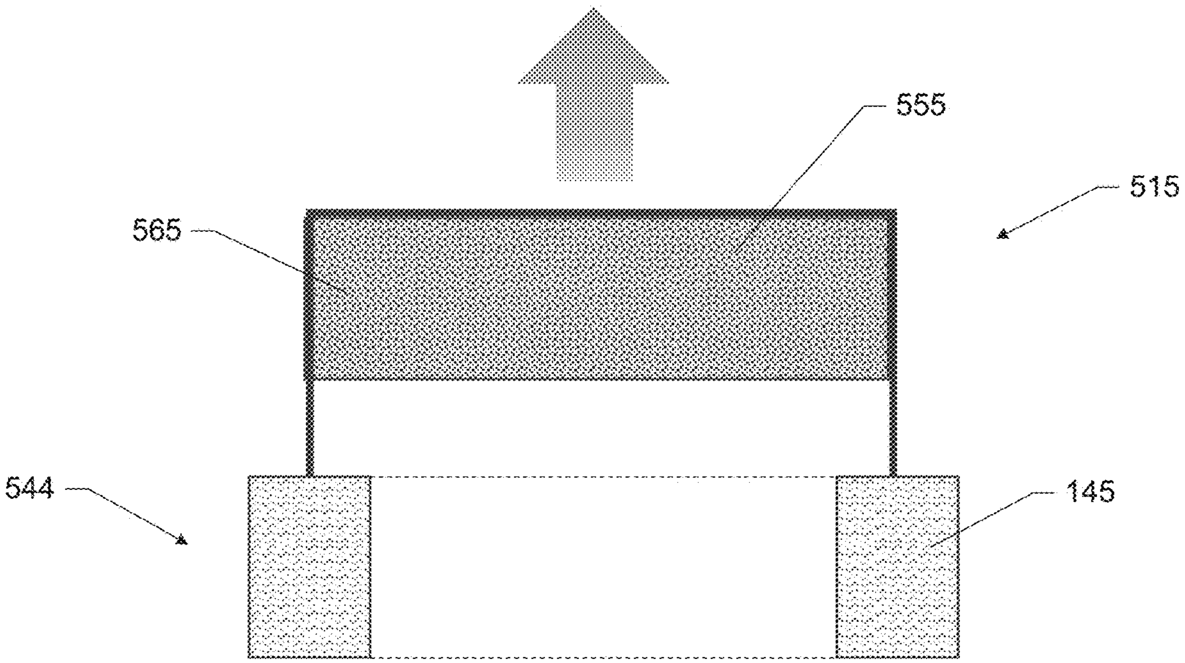
FIG. 9 illustrates a side schematic view of a liquid delivery and atomization assembly, in accordance with an example implementation of the present disclosure.

In some implementations, the liquid transport element may be in the shape of a ring or strip that doesn't completely cover the surface of the piezoelectric component. For example, FIG. 9 illustrates a side schematic view of a liquid transport and atomization assembly, in accordance with an example implementation of the present invention. In particular, FIG. 9 illustrates an atomization assembly 515 that includes a piezoelectric component 555 that includes an interdigital transducer (IDT) configured to generate surface acoustic waves that vaporize at least a portion of the liquid composition to generate an aerosol. Reference is made to the above descriptions of these components (and possible variations thereof), which will not be repeated here. In the depicted implementation, the atomization assembly 515 is fluidly coupled with at least a portion of a liquid composition 545 contained in a reservoir 544 via a liquid transport element 565. Although other implementations may differ, in the depicted implementation the liquid reservoir comprises a ring structure having an inner diameter and an outer diameter, and an open central area defined inside of the inner diameter. In the depicted implementation, the liquid transport element 565 comprises a strip of material having a width that does not completely cover the surface of the piezoelectric component 555. Reference is made to various liquid compositions and liquid transport element materials (and possible variations thereof), which will not be repeated here. In the depicted implementation, the reservoir 544 is located upstream from the atomization assembly 515.

Figure 10:
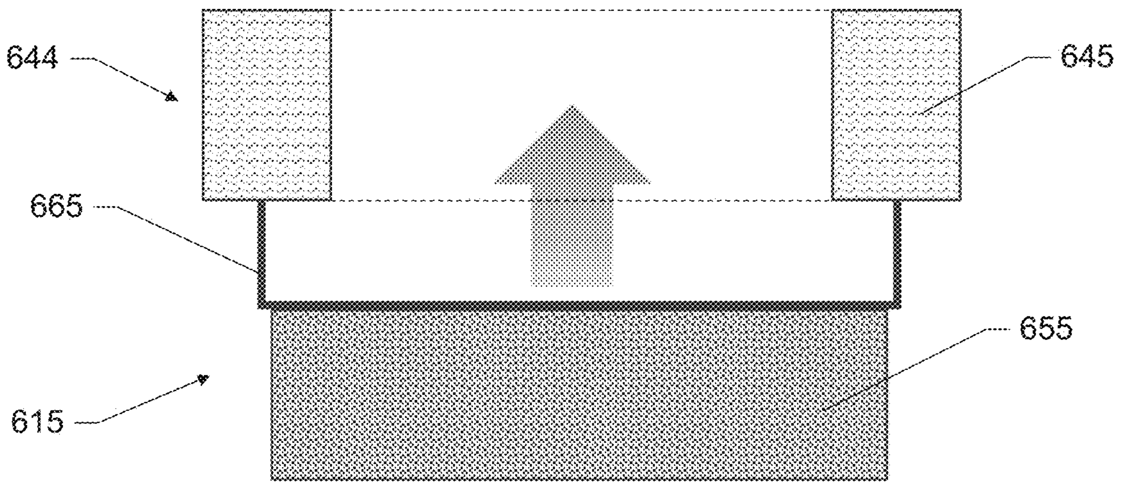
FIG. 10 illustrates a side schematic view of a liquid delivery and atomization assembly, in accordance with an example implementation of the present disclosure.

FIG. 10 illustrates a side schematic view of a liquid transport and atomization assembly, in accordance with another example implementation of the present invention. In particular, FIG. 10 illustrates an atomization assembly 615 that includes a piezoelectric component 655 that includes an interdigital transducer (IDT) configured to generate surface acoustic waves that vaporize at least a portion of the liquid composition to generate an aerosol. Reference is made to the above descriptions of these components (and possible variations thereof), which will not be repeated here. In the depicted implementation, the atomization assembly 615 is fluidly coupled with at least a portion of a liquid composition 645 contained in a reservoir 644 via a liquid transport element 665. Although other implementations may differ, in the depicted implementation the liquid reservoir comprises a ring structure having an inner diameter and an outer diameter, and an open central area defined inside of the inner diameter. In the depicted implementation, the liquid transport element 665 comprises a strip of material having a width that does not completely cover the surface of the piezoelectric component 655. Reference is made to various liquid compositions and liquid transport element materials (and possible variations thereof), which will not be repeated here. In the depicted implementation, the reservoir 644 is located upstream from the atomization assembly 615. In such a manner, aerosol generated by the atomization assembly 615 flows through the open central area of the reservoir 644.

Although in some implementations of the present disclosure a cartridge and a control unit may be provided together as a complete aerosol delivery device generally, these components may be provided separately. For example, the present disclosure also encompasses a disposable unit for use with a reusable unit. In specific implementations, such a disposable unit (which may be a cartridge as illustrated in the appended figures) can be configured to engage a reusable unit (which may be a control unit as illustrated in the appended figures). In still other configurations, a cartridge may comprise a reusable unit and a control unit may comprise a disposable unit.

Although some figures described herein illustrate a cartridge and a control unit in a working relationship, it is understood that the cartridge and the control unit may exist as individual components. Accordingly, any discussion otherwise provided herein in relation to the components in combination also should be understood as applying to the control unit and the cartridge as individual and separate components.

In another aspect, the present disclosure may be directed to kits that provide a variety of components as described herein. For example, a kit may comprise a control unit with one or more cartridges. A kit may further comprise a control unit with one or more charging components. A kit may further comprise a control unit with one or more batteries. A kit may further comprise a control unit with one or more cartridges and one or more charging components and/or one or more batteries. In further implementations, a kit may comprise a plurality of cartridges. A kit may further comprise a plurality of cartridges and one or more batteries and/or one or more charging components. In the above implementations, the cartridges or the control units may be provided with a heating member inclusive thereto. The inventive kits may further include a case (or other packaging, carrying, or storage component) that accommodates one or more of the further kit components. The case could be a reusable hard or soft container. Further, the case could be simply a box or other packaging structure.

Many modifications and other implementations of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device comprising:

a housing including a power source and a control component;

a reservoir configured to contain a liquid composition;

an atomization assembly; and a liquid transport element configured to transport at least a portion of the liquid composition to the atomization assembly, wherein the atomization assembly is configured to be controlled by the control component and comprises a piezoelectric component that includes an interdigital transducer configured to generate surface acoustic waves that vaporize the portion of the liquid composition to generate an aerosol, wherein the liquid transport element comprises a fibrous material that includes fibers having a multi-lobal cross-section including a central portion and at least three lobes extending therefrom, wherein at least a portion of the atomization assembly is configured to be heated via an induction heating arrangement, wherein a helical coil comprises a resonant transmitter of the induction heating arrangement, and wherein the helical coil substantially surrounds the piezoelectric component, wherein the liquid transport element comprises a combination of the fibrous material and a perforated disk, wherein the perforated disk includes a plurality of openings and a plurality of microchannels, and wherein the plurality of openings extend through at least a portion of the disk and each of the plurality of microchannels extends from a periphery of the disk to a respective one of the plurality of openings.

2. The aerosol delivery device of Claim 1, wherein at least a portion of the piezoelectric component comprises a resonant receiver of the induction heating arrangement.

3. The aerosol delivery device of Claim 1, wherein at least a portion of the piezoelectric component is coated with a material configured to facilitate induction heating.

4. The aerosol delivery device of Claim 1, wherein the piezoelectric component is loaded with a material configured to facilitate induction heating.

5. The aerosol delivery device of claim 1, wherein the piezoelectric component comprises a piezoceramic.

6. The aerosol delivery device of claim 5, wherein the piezoceramic is in the form of a disk or a ring.

7. The aerosol delivery device of claim 1, wherein the piezoelectric component comprises a piezoelectric material deposited on a surface of a substrate.

8. An aerosol delivery device comprising:

a housing including a power source and a control component;

a reservoir configured to contain a liquid composition;

an atomization assembly; and a liquid transport element configured to transport at least a portion of the liquid composition to the atomization assembly, wherein the atomization assembly is configured to be controlled by the control component and comprises a piezoelectric component that includes an interdigital transducer configured to generate surface acoustic waves that vaporize the portion of the liquid composition to generate an aerosol, wherein the liquid transport element comprises a perforated disk wherein the perforated disk includes a plurality of openings and a plurality of microchannels, and wherein the plurality of openings extend through at least a portion of the disk and each of the plurality of microchannels extends from a periphery of the disk to a respective one of the plurality of openings, wherein at least a portion of the atomization assembly is configured to be heated via an induction heating arrangement, wherein a helical coil comprises a resonant transmitter of the induction heating arrangement, and wherein the helical coil substantially surrounds the piezoelectric component.

9. The aerosol delivery device of claim 8, wherein the piezoelectric component comprises a piezoelectric material deposited on a surface of a substrate.

10. The aerosol delivery device of claim 8, wherein at least a portion of the piezoelectric component comprises a resonant receiver of the induction heating arrangement.

11. The aerosol delivery device of claim 8, wherein at least a portion of the piezoelectric component is coated with a material configured to facilitate induction heating.

12. The aerosol delivery device of claim 8, wherein the piezoelectric component is loaded with a material configured to facilitate induction heating.

13. The aerosol delivery device of claim 8, wherein the piezoelectric component comprises a piezoceramic.

14. The aerosol delivery device of claim 13, wherein the piezoceramic is in the form of a disk or a ring.

* * * * *